(12) United States Patent
Hong et al.

(10) Patent No.: US 12,507,186 B2
(45) Date of Patent: Dec. 23, 2025

(54) METHOD AND APPARATUS FOR DETERMINING FREQUENCY-DOMAIN OFFSET, COMMUNICATION DEVICE, AND READABLE STORAGE MEDIUM

(71) Applicant: VIVO MOBILE COMMUNICATION CO., LTD., Guangdong (CN)

(72) Inventors: Qi Hong, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 509 days.

(21) Appl. No.: 17/974,679

(22) Filed: Oct. 27, 2022

(65) Prior Publication Data

US 2023/0050913 A1 Feb. 16, 2023

Related U.S. Application Data

(63) Continuation of application No. PCT/CN2021/089882, filed on Apr. 26, 2021.

(30) Foreign Application Priority Data

Apr. 30, 2020 (CN) .......................... 202010368255.9

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0007* (2013.01); *H04L 27/2657* (2013.01)

(58) Field of Classification Search
CPC .................................................. H04W 56/001
See application file for complete search history.

(56) References Cited

U.S. PATENT DOCUMENTS

2019/0306832 A1    10/2019  Si et al.
2019/0327696 A1*   10/2019  Oh ....................... H04W 56/001
2019/0393998 A1*   12/2019  Lei ......................... H04W 76/27
(Continued)

FOREIGN PATENT DOCUMENTS

CA        3114564 A1    4/2020
CN       108496317 A    9/2018
(Continued)

OTHER PUBLICATIONS

Vivo, Remaining issues on synchronization signal, 3GPP TSG RAN WG1 Meeting #93, R1-1806033, May 21-25, 2018, Busan, Korea.
(Continued)

*Primary Examiner* — Jason E Mattis
(74) *Attorney, Agent, or Firm* — Price Heneveld LLP

(57) ABSTRACT

This application provides a method and an apparatus for determining a frequency-domain offset, a communication device, and a readable storage medium. The method includes: detecting a synchronization signal block SSB; and determining, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

20 Claims, 5 Drawing Sheets

(56) References Cited

U.S. PATENT DOCUMENTS

| | | | |
|---|---|---|---|
| 2020/0099500 A1* | 3/2020 | Huang | H04W 72/30 |
| 2020/0260368 A1 | 8/2020 | Liu | |
| 2020/0313835 A1* | 10/2020 | Ji | H04L 5/0053 |
| 2020/0359343 A1 | 11/2020 | Da et al. | |
| 2021/0092008 A1 | 3/2021 | Yi et al. | |
| 2021/0297969 A1 | 9/2021 | Myung et al. | |
| 2021/0377950 A1 | 12/2021 | Takahashi et al. | |
| 2022/0174624 A1* | 6/2022 | Wu | H04L 5/0094 |
| 2022/0210754 A1* | 6/2022 | Harada | H04W 56/0015 |
| 2022/0279553 A1* | 9/2022 | Mu | H04W 48/12 |
| 2022/0361122 A1* | 11/2022 | Zheng | H04L 5/0098 |
| 2023/0164847 A1* | 5/2023 | Kim | H04W 74/0866 370/329 |

FOREIGN PATENT DOCUMENTS

| | | |
|---|---|---|
| CN | 110035493 A | 7/2019 |
| CN | 110710301 A | 1/2020 |
| CN | 110870374 A | 3/2020 |
| EP | 3573392 A1 | 11/2019 |
| WO | 2019083277 A1 | 5/2019 |
| WO | 2020032725 A1 | 2/2020 |
| WO | 2020065862 A1 | 4/2020 |

OTHER PUBLICATIONS

Ericsson, Running CR for the introduction of NR positioning, 3GPP TSG-RAN2 Meeting #108, R2-1915690, Nov. 18-22, 2019, Reno, USA.

3rd Generation Partnership Project, "Physical channels and modulation (Release 16)", Technical Specification Group Radio Access Network, 3GPP TS 38.211, v16.1.0, Mar. 2020.

* cited by examiner

METHOD AND APPARATUS FOR DETERMINING FREQUENCY-DOMAIN OFFSET, COMMUNICATION DEVICE, AND READABLE STORAGE MEDIUM

CROSS-REFERENCE TO RELATED APPLICATIONS

This application is a continuation application of International Application No. PCT/CN2021/089882 filed on Apr. 26, 2021, which claims priority to Chinese Patent Application No. 202010368255.9, filed in China on Apr. 30, 2020, which are incorporated herein by reference in their entireties.

TECHNICAL FIELD

This application relates to the communication field, and in particular, to a method and an apparatus for determining a frequency-domain offset, a communication device, and a readable storage medium.

BACKGROUND

In FR2x, which are beyond 52.6 GHz bands, it is possible that a subcarrier spacing (SCS) of the synchronization signal block (SSB) is less than an SCS of the common resource block (CRB), for example, SSB SCS=480 k and CRB SCS=960 k. During implementation of this application, the inventors have found that at least the following problem exists in the prior art: if $K_{ssb}$ is configured as defined by the current protocol ($K_{ssb}$ is represented by four bits in FR2), where $K_{ssb}$ is an offset of the lowest frequency of SSB resources to $N_{CRB}^{SSB}$. As some sync rasters or channel rasters may be unusable, an indication effect of $K_{ssb}$ may be undesirable.

SUMMARY

According to a first aspect, an embodiment of this application provides a method for determining a frequency-domain offset, including: detecting a synchronization signal block SSB; and determining, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

According to a second aspect, an embodiment of this application provides an apparatus for determining a frequency-domain offset, including: a detection module, configured to detect a synchronization signal block SSB; and a determining module, configured to determine, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

According to a third aspect, an embodiment of this application provides a communication device, where the communication device includes a processor, a memory, and a program or an instruction stored on the memory and capable of running on the processor, and when the program or instruction is executed by the processor, the steps of the method according to the first aspect are implemented.

According to a fourth aspect, an embodiment of this application provides a readable storage medium, where the readable storage medium stores a program or an instruction, and when the program or instruction is executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or an instruction to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, in this specification and claims, "and/or" represents at least one of connected objects, and the symbol "/" generally represents an "or" relationship between the associated objects.

Related terms in this application are first described.
1. Initial Searching

Initial searching is needed when user equipment (UE) is powered on or performs inter-cell handover, so as to obtain downlink synchronization of the cell: (1) time synchronization detection; and (2) frequency synchronization detection.

It should be noted that a main function of initial searching is to find a usable network, that is, the UE performs blind searching on frequency bands in the entire network based on an operating frequency band supported by the UE and a synchronization signal block number global synchronization channel number (GSCN) stipulated in a protocol. According to the stipulation in the protocol, in an FR2 band (24.25

G-100 GHz), the UE performs blind detection at a step of 17.28 MHz to find an appropriate frequency band accessible to the UE.

2. SSB Structure

Figure 1:
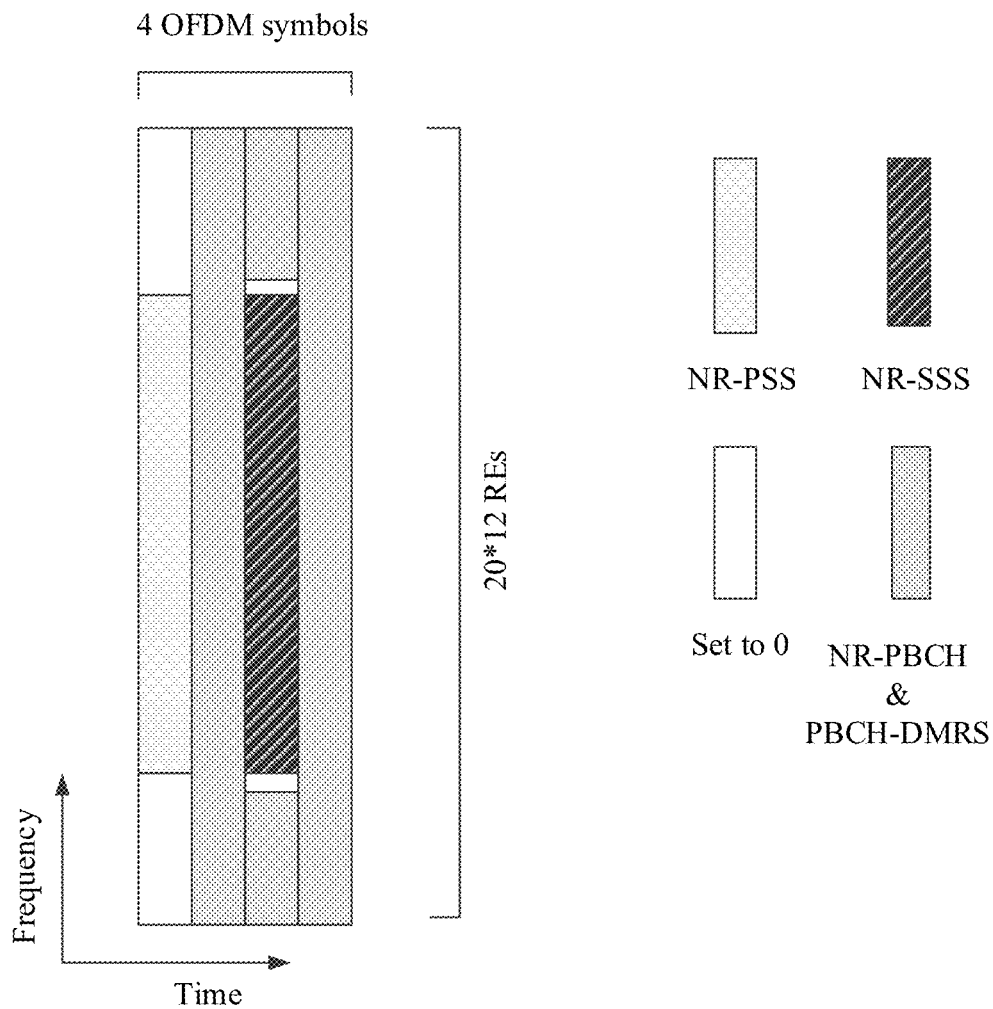
FIG. 1 is a schematic structural diagram of an SSB according to an embodiment of this application.

The initial searching process is implemented using a synchronization signal block (SSB). The SSB includes a primary synchronization signal (PSS), a secondary synchronization signal (SSS), a physical broadcast channel (PBCH), and a demodulation reference signal (DMRS) in four consecutive orthogonal frequency division multiplexing (OFDM) symbols, mainly used for downlink synchronization and having a structure shown in FIG. 1.

3. Absolute Coordinate System

The absolute coordinate system is a coordinate system with Point A as a reference point and a common resource block (CRB) as a "scale", where Point A corresponds to a center point of carrier 0 of the CRB, and the CRB includes 12 carriers in frequency domain, which are numbered upward from 0 starting from Point A. One of functions of absolute coordinates is to find positions of available resources by using Point A.

4. Indication by $K_{ssb}$

Figure 2:
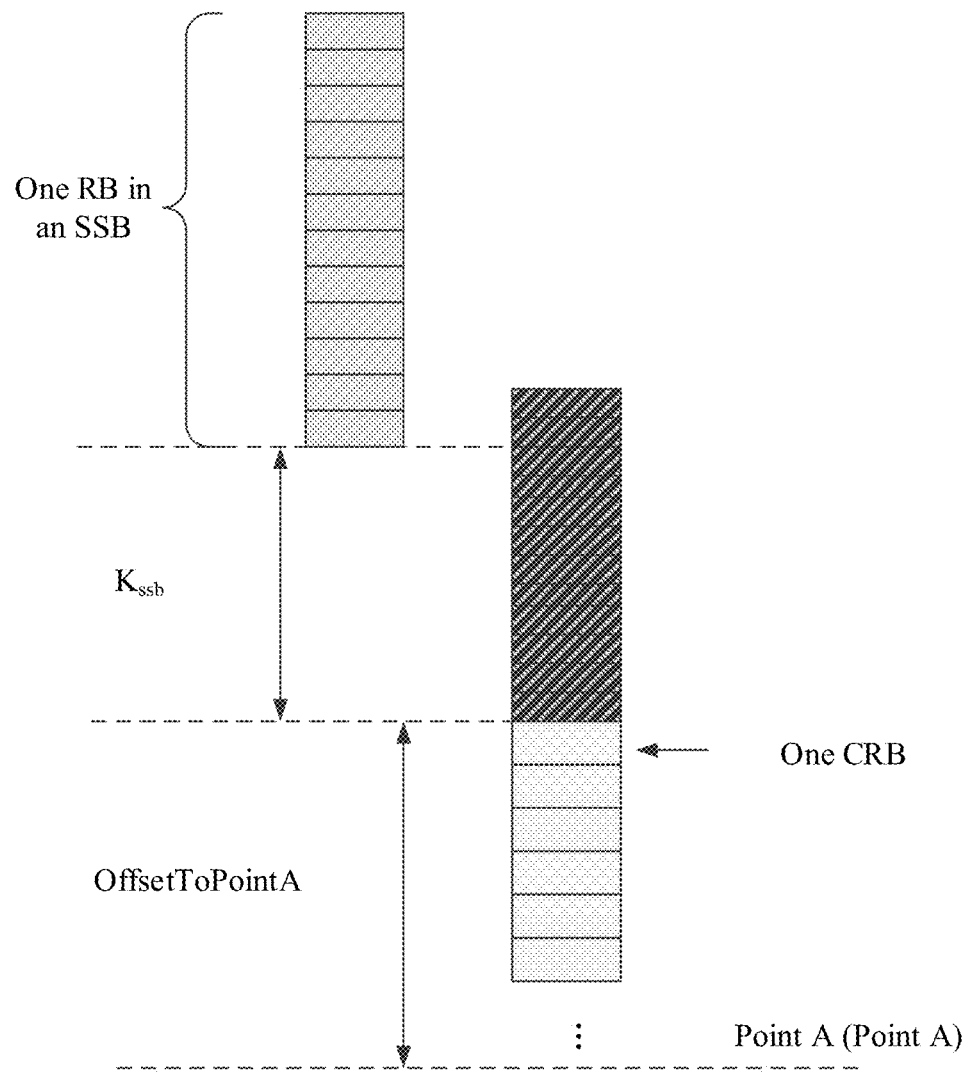
FIG. 2 is a schematic diagram of a relationship between Point A, offsetToPointA, and $K_{ssb}$ according to an embodiment of this application.

After SSS/PSS, physical broadcast channel (PBCH), and SIB1 are successfully decoded, a position of Point A can be obtained relative to a known position of the SSB (a quantity of frequency domain and time domain resources of the SSB is fixed), and main parameters included are: (1) $K_{ssb}$, indicating an offset of the lowest frequency of SSB resources to $N_{CRB}^{SSB}$; and (2) offsetTopointA, indicating a quantity of reference RBs between $N_{CRB}^{SSB}$ and Point A. As shown in FIG. 2, FIG. 2 is a schematic diagram of a relationship between Point A, offsetToPointA, and $K_{ssb}$ according to an embodiment of this application.

In addition, according to the description in a standard protocol, an SCS of offsetToPointA is a given value, being 15 k for FR1 and 60 k for FR2. An SCS of the CRB is configured according to higher-layer subCarrierSpacing-Common, being 15 k and 30 k for FR1 and 60 k and 120 k for FR2. An SCS of $K_{ssb}$ is 15 k for FR1 and is configured for FR2 according to the higher-layer subCarrierSpacing-Common. In addition, a value of $K_{ssb}$ for FR2 is indicated by ssb-SubcarrierOffset, with a total of 4 bits: $2^4=16$. Therefore, one RB, that is, 12 subcarriers, can be supported. However, for FR1, four least significant bits of $K_{ssb}$ is indicated by ssb-SubcarrierOffset, and one most significant bit of $K_{ssb}$ is indicated by the A+6 bit in the PBCH excluding the MIB.

5. PBCH

Because an internal structure of the SSB is standardized by the protocol, after searching a synchronization signal on a specific synchronization frequency, the UE may attempt to decode the SSB, where the most important information included in the SSB is a master information block (MIB), and the MIB includes the following information:

systemFrameNumber IE: a system frame number, where a complete system frame number requires 10 bits, with only six most significant bits of the frame number carried in the payload of the MIB and four least significant bits transmitted in non-MIB bits of a PBCH transport block;

subCarrierSpacingCommon IE: a subcarrier spacing for downlink signals in an initial access procedure, indicating a subcarrier spacing of SIB1, OSI, Msg2/Msg4 for initial access, or paging messages;

ssb-SubcarrierOffset IE: a quantity of subcarriers between the lowest subcarrier of the SSB and a closest PRB;

dmrs-Type A-Position IE: a configuration for a PDSCH-DMRS reference signal.

pdcch-ConfigSIB1 IE: a configuration for SIB1 PDCCH, including control resource set (CORESET) and search space configurations;

cellBarred IE: a radio resource control (RRC) access control parameter, indicating whether the cell is forbidden;

intraFreqReselection IE: an RRC access control parameter, indicating whether intra-frequency reselection is allowed in the cell; and spare: a reserved bit.

Figure 3:
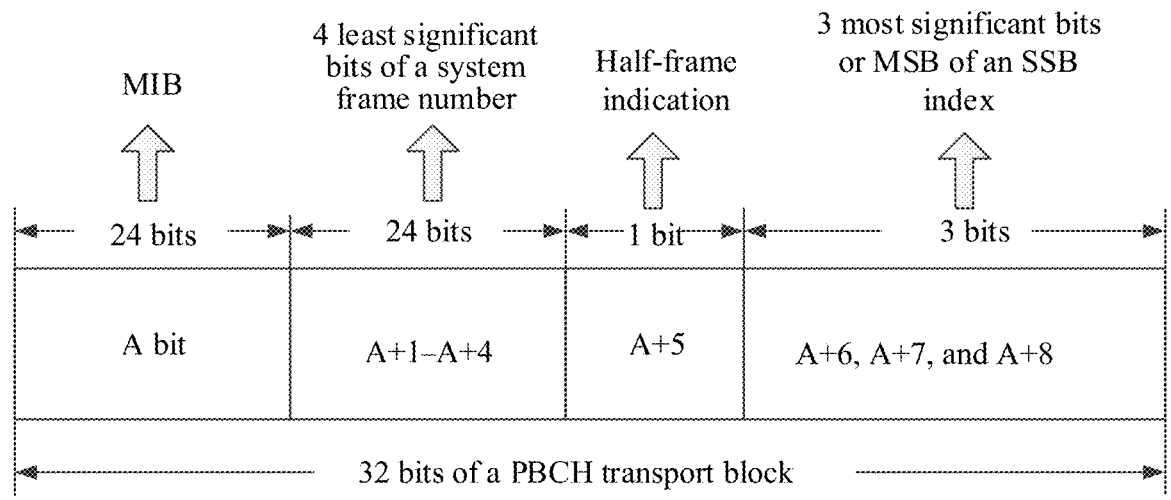
FIG. 3 is a schematic structural diagram of a PBCH according to an embodiment of this application.

As shown in FIG. 3, in addition to the MIB information, the PBCH also includes some other information:

A+1-A+4: 4-bit frame number information that is added, where after four least significant bits of the system frame number are obtained, the complete 10-bit frame number information can be obtained in combination with the 6-bit systemFrameNumber in the MIB;

A+5: half-frame information bit that is added, where the bit indicates the first half frame or the second half frame; and A+6-A+8: in the case of a largest SSB index L=64 (namely, F>6 GHz), A+6-A+8 indicate three most significant bits of an SSB index; otherwise, A+6 indicates one most significant bit of $K_{ssb}$, and A+7/A+8 is a reserved bit.

The following describes in detail the method and apparatus for determining a frequency-domain offset provided in the embodiments of this application by using specific embodiments and application scenarios thereof with reference to the accompanying drawings, and the method and apparatus may be applied to a wireless communication system. The wireless communication system may be a new radio (NR) system or other systems, such as an evolved long term evolution (eLTE) system, a long term evolution (LTE) system, or a later evolved communication system. Further, the method and apparatus may be applied to an unlicensed band in the wireless communication system.

Figure 4:
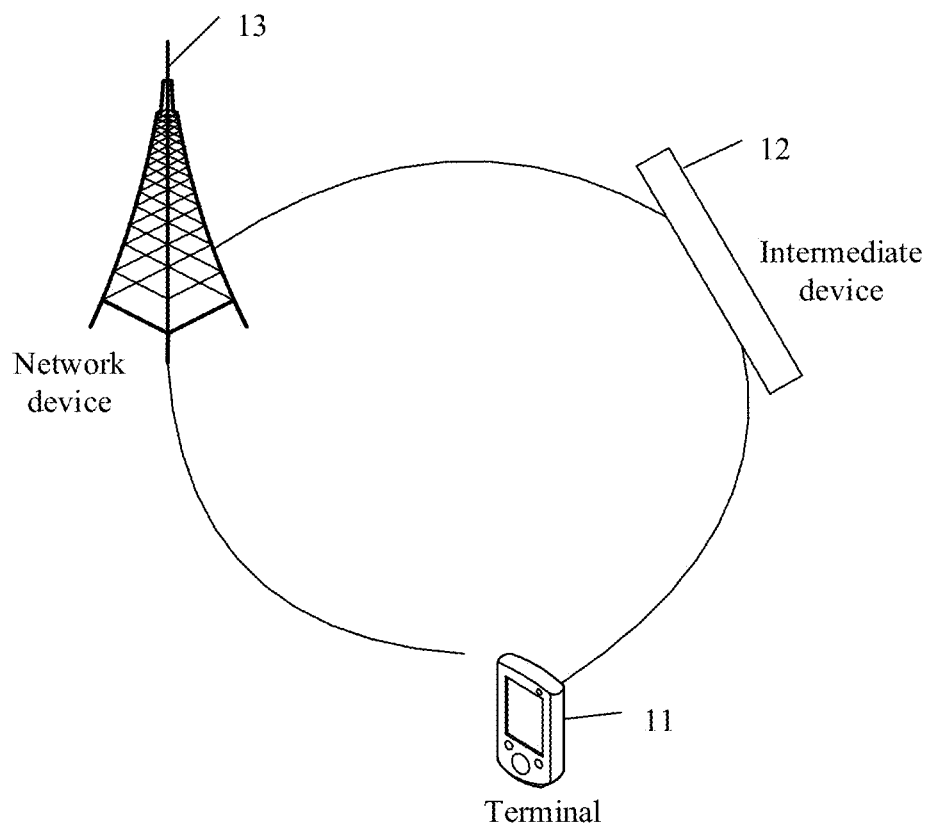
FIG. 4 is a structural diagram of a network system to which the embodiments of this application are applicable.

Referring to FIG. 4, FIG. 4 is a structural diagram of a network system to which the embodiments of this application are applicable. As shown in FIG. 4, the network system includes a terminal 11, an intermediate device 12, and a network device 13. The terminal 11 may be a user terminal (UE) or other terminal-side devices such as a mobile phone, a tablet personal computer, a laptop computer, a personal digital assistant (PDA), a mobile internet device (MID), a wearable device, or a robot. It should be noted that a specific type of the terminal 11 is not limited in the embodiments of this application. The intermediate device 12 may be a device made of a new artificial metamaterial such as large intelligent surfaces (LIS), a backscatter device a Wi-Fi device, a relay device (for example, a layer-1 relay, an amplify-and-forward relay, or a transparent forward relay), or the like. The network device 13 may be a network device, a Wi-Fi device, or a terminal device. The network device may be a 4G base station, or a 5G base station, or a base station of a later version, or a base station in other communication systems, or may be referred to as a NodeB, or an evolved NodeB, or a transmission reception point (TRP), or an access point (AP), or other terms in the field. Provided that a same technical effect is achieved, the network device is not limited to any specific technical term. In addition, the network device 13 may be a master node (MN) or a secondary node (SN).

In this embodiment of this application, the terminal 11 may communicate with the network device 13 through the intermediate device 12, for example, the intermediate device 12 may forward a signal sent by the terminal 11 to the network device 13, or forward a signal sent by the network device 13 to the terminal 11. Forwarding by the intermediate device 12 may be direct forwarding, transparent forwarding, amplification and forwarding, frequency conversion or modulation on the signal and then transmission, or the like, which is not limited herein. Certainly, in this embodiment of this application, the signal transmitted between the terminal 11 and the intermediate device 12 may be a signal to be transmitted between the terminal 11 and the intermediate device 12, that is, the network device 13 may not be included in this scenario. In addition, the terminal 11 may directly communicate with the network device 13.

In addition, in this embodiment of this application, the LIS device is a device made of a new artificial material. The LIS node is capable of dynamically or semi-statically adjusting its own electromagnetic properties to affect reflection or refraction behavior of electromagnetic waves incident on the LIS node, for example, changing a frequency, an amplitude, a phase, a polarization direction, and beam space energy distribution of a reflected or refracted signal. The LIS node may manipulate a reflected wave or a refracted signal of an electromagnetic signal to implement functions such as beam sweeping or beamforming.

It should be noted that the method for determining a frequency-domain offset provided in the embodiments of this application may be performed by a communication device, and the communication device may be the terminal or intermediate device described above. This embodiment of this application describes the method for determining a frequency-domain offset provided in the embodiments of this application by using an example in which the terminal performs the method for determining a frequency-domain offset.

Figure 5:
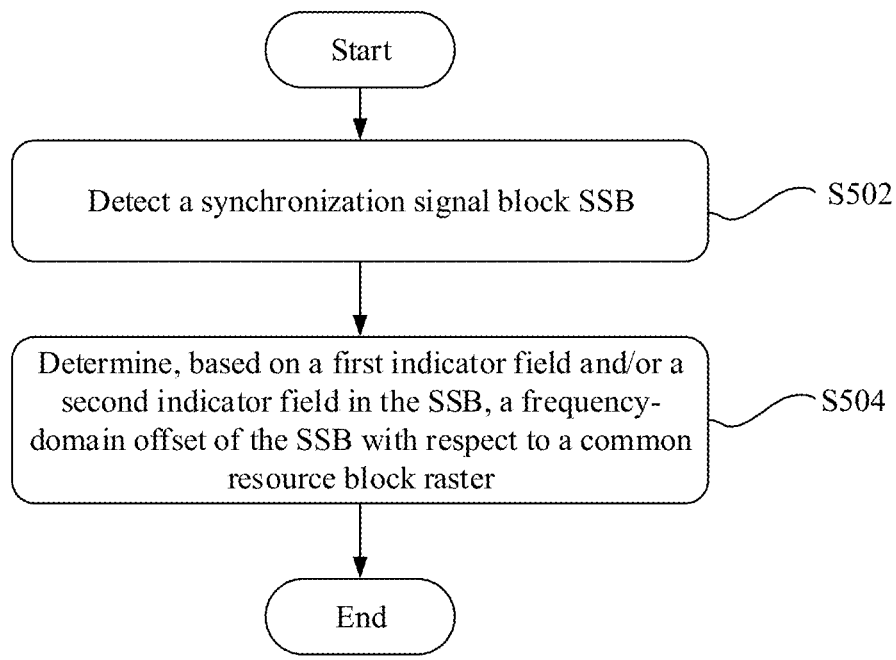
FIG. 5 is a flowchart of a method for determining a frequency-domain offset according to an embodiment of this application.

Referring to FIG. 5, FIG. 5 is a flowchart of a method for determining a frequency-domain offset according to an embodiment of this application. As shown in FIG. 5, the method includes the following steps.

Step S502. Detect a synchronization signal block SSB.

Step S504. Determine, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

It should be noted that SSB detection being performed on a first frequency band is used as an example in this embodiment of this application, and the first frequency band in specific application scenarios may be part or all of a sync raster or other frequency bands for synchronization signal block transmission.

In an optional embodiment of this application, the second indicator field involved in this application may be at least one of the following cases.

Case 1: The second indicator field is part or all of a common SCS indicator field.

Optionally, in case 1 with the second indicator field being part or all of a common SCS indicator field, a prerequisite is presence of an association relationship between a common subcarrier spacing SCS and a first SCS, where the first SCS is an SCS of the SSB determined in a case that the SSB is detected on the first frequency band.

Based on case 1, in a specific application scenario, the method for determining a frequency-domain offset in this embodiment of this application may be that: for frequency bands above 52.6 GHz, an SCS of CORESET#0 can be obtained by using an SCS of an SSB, that is, a binding relationship is present between the SCS of the SSB and the SCS of CORESET#0, for example, (SSB, CORESET#0)= (480K, 960K), (960K, 960K), or (1920K, 1920K) is supported. In this case, when the SCS of the SSB is 480K or 960K, the SCS of CORESET#0 is 960K; and when the SCS of the SSB is 1920K, the SCS of CORESET#0 is 1920K. In this case, the subCarrierSpacingCommon indicator field for the frequency bands above 52.6 GHz may be used to indicate the most significant bit or the least significant bit of $K_{ssb}$: when this indicator field indicates the most significant bit, ssb-SubcarrierOffset indicates four least significant bits of $K_{ssb}$; and when this indicator field indicates the least significant bit, ssb-SubcarrierOffset indicates four most significant bits of $K_{ssb}$.

In other words, if the SCS in an initial access procedure is a fixed value, subCarrierSpacingCommon may be used to indicate $K_{ssb}$. It should be noted that for specific application in the scenario with frequency bands above 52.6 GHz, the subCarrierSpacingCommon indicator field is the second indicator field, and ssb-SubcarrierOffset is the first indicator field. In such manner in this embodiment of this application, an existing unused indicator field may be used along with ssb-SubcarrierOffset to indicate $K_{ssb}$, not requiring additional bits. This can reduce resources and use more bits for configuration of $K_{ssb}$, implementing more flexible configuration of $K_{ssb}$.

Case 2: The second indicator field is part or all of a physical downlink shared channel-demodulation reference signal position indicator field.

In case 2 with the second indicator field being part or all of a physical downlink shared channel-demodulation reference signal position indicator field, a prerequisite is that: in a case that an association relationship is present between the physical downlink shared channel-demodulation reference signal position indicator field and a first SCS, the second indicator field is part or all of the physical downlink shared channel-demodulation reference signal position indicator field, and the first SCS is an SCS of the SSB determined in a case that the SSB is detected on the first frequency band.

Based on case 2, in a specific application scenario, the method for determining a frequency-domain offset in this embodiment of this application may be that: for frequency bands above 52.6 GHz, a physical downlink shared channel (PDSCH)-demodulation reference signal (DMRS), namely, PDSCH-DMRS, where a reference signal position is determined as 2 or 3, or a binding relationship is present between the reference signal position and an SCS, for example, SCS480 corresponds to the reference position 2 and SCS960 corresponds to the reference position 3. In this case, DMRS-TypeA-Position does not need to indicate a position of the PDSCH-DMRS, and the DMRS-TypeA-Position indicator field in the SSB for transmission on the frequency bands above 52.6 GHz may be used to indicate the most significant bit or the least significant bit of $K_{ssb}$: when this indicator field indicates the most significant bit, ssb-SubcarrierOffset indicates four least significant bits of $K_{ssb}$; and when this indicator field indicates the least significant bit, ssb-SubcarrierOffset indicates four most significant bits of $K_{ssb}$.

In other words, if the position of PDSCH-DMRS reference signal is determined, DMRS-TypeA-Position may be used to indicate $K_{ssb}$. It should be noted that the DMRS-TypeA-Position indicator field in the SSB for transmission on the frequency bands above 52.6 GHz in the specific application scenario described above is the second indicator field, and ssb-SubcarrierOffset is the first indicator field. It can be learned that in such manner in this embodiment of this application, an existing unused indicator field may be used along with ssb-SubcarrierOffset to indicate $K_{ssb}$, not requiring additional bits. This can reduce resources and use more bits for configuration of $K_{ssb}$, implementing more flexible configuration of $K_{ssb}$.

Case 3: The second indicator field is part or all of a physical downlink control channel-configuration system information block indicator field.

Based on case 3, in a specific application scenario, the method for determining a frequency-domain offset in this embodiment of this application may be that: for frequency bands above 52.6 GHz, a configuration table of CORESET#0 is modified, with reduced valid entries, for example, only an FDM multiplexing pattern between SSB and CORESET#0 is supported, or multiplexing pattern 2/3 between SSB and CORESET#0 is supported. An example is shown in Table 1, where only 2 bits are required for configuring CORESET#0. However, for FR1 and FR2, 4 bits are required for indication. In this case, M most significant bits or M least significant bits (M≥1) configured for CORESET#0 in the SSB for transmission on the frequency bands above 52.6 GHz may be used to indicate the most significant bit or the least significant bit of $K_{ssb}$: when these M bits indicate the most significant bit, ssb-SubcarrierOffset indicates four least significant bits of $K_{ssb}$; and when these M bits indicate the least significant bit, ssb-SubcarrierOffset indicates four most significant bits of $K_{ssb}$.

Likewise, a configuration table of Search space #0 may also be used for indication of $K_{ssb}$ as CORESET#0.

TABLE 1

| Index | SS/PBCH block and CORESET multiplexing pattern | Number of RBs $N_{RB}^{CORESET}$ | Number of Symbols $N_{symb}^{CORESET}$ |
|---|---|---|---|
| 0 | 2 | 48 | 1 |
| 1 | 2 | 48 | 1 |
| 2 | 2 | 96 | 1 |
| 3 | 2 | 96 | 1 |
| 4-15 | Reserved | | |

In other words, if a CORESET of SIB1_PDCCH and a search space do not need to be indicated by using 8 bits, a spare bit may be used to indicate $K_{ssb}$. It should be noted that the M most significant bits or M least significant bits (M≥1) configured for CORESET#0 in the SSB for transmission on the frequency bands above 52.6 GHz are the second indicator field, and ssb-SubcarrierOffset is the first indicator field. It can be learned that in such manner in this embodiment of this application, an existing unused indicator field may be used along with ssb-SubcarrierOffset to indicate $K_{ssb}$, not requiring additional bits. This can reduce resources and use more bits for configuration of $K_{ssb}$, implementing more flexible configuration of $K_{ssb}$.

Case 4: The second indicator field is part or all of a reserved indicator field.

Based on an option of the second indicator field, in a specific application scenario, this embodiment of this application may be that: for frequency bands above 52.6 GHz, a spare bit of the SSB on the frequency bands is used to indicate the most significant bit or the least significant bit of $K_{ssb}$. When this bit indicates the most significant bit, ssb-SubcarrierOffset indicates four least significant bits of $K_{ssb}$; and when this bit indicates the least significant bit, ssb-SubcarrierOffset indicates four most significant bits of $K_{ssb}$.

It should be noted that the spare bit of the SSB on the frequency bands above 52.6 GHz is the second indicator field, and ssb-SubcarrierOffset is the first indicator field. It can be learned that in such manner in this embodiment of this application, an existing unused indicator field may be used along with ssb-SubcarrierOffset to indicate $K_{ssb}$, not requiring additional bits. This can reduce resources and use more bits for configuration of $K_{ssb}$, implementing more flexible configuration of $K_{ssb}$.

Case 5: The second indicator field is a combination of at least one of the following indicator fields: a common SCS indicator field, a physical downlink shared channel-demodulation reference signal position indicator field (PDSCH-DMRS), a physical downlink control channel-configuration system information block indicator field, and a reserved indicator field.

In other words, a bit combination of the indicator fields in cases 1 to 4 may be used to indicate N most significant bits or N least significant bits (N>1) of $K_{ssb}$. For example, one bit of the common SCS indicator field is combined with one bit of the PDSCH-DMRS indicator field, or one bit of the common SCS indicator field is combined with two bits of the reserved indicator field, where when the bit combination indicates the N most significant bits, ssb-SubcarrierOffset indicates four least significant bits of $K_{ssb}$; and when the bit combination indicates the N least significant bits, ssb-SubcarrierOffset indicates four most significant bits of $K_{ssb}$.

It can be learned that compared with the manner of using a single indicator field as the second indicator field in cases 1 to 4, for that of using a combination of a plurality of indicator fields as the second indicator field in case 5, more bits can be used to indicate $K_{ssb}$, that is, there are more possibilities for indication of $K_{ssb}$.

Optionally, the frequency-domain offset in this embodiment of this application includes a frequency-domain offset jointly indicated by a first bit of the first indicator field and a second bit of the second indicator field. A bit quantity of the first bit may be one or more, and a bit quantity of the second bit may also be one or more.

Further, the second bit of the second indicator field includes at least one of the following: a spare bit of the second indicator field and a reserved bit of the second indicator field. It can be learned from an example of cases 1 to 4 that the spare bit may be one or more bit combination in a combination of the following indicator fields: a common SCS indicator field, a physical downlink shared channel-demodulation reference signal position indicator field (PDSCH-DMRS), and a physical downlink control channel-configuration system information block indicator field; and the reserved bit is a bit of a reserved indicator field.

Optionally, in other implementations of this application, the frequency-domain offset in this application may further include: a frequency-domain offset indicated by the first bit of the first indicator field, or a frequency-domain offset indicated by the second bit of the second indicator field. In other words, the frequency-domain offset may be separately indicated by the first bit of the first indicator field or the second bit of the second indicator field.

It should be noted that the method for determining a frequency-domain offset in this embodiment of this application may be performed by an apparatus for determining a frequency-domain offset or a module for performing the method for determining a frequency-domain offset in the apparatus for determining a frequency-domain offset. This embodiment of this application describes the method for determining a frequency-domain offset provided in the embodiments of this application by using an example in which the apparatus for determining a frequency-domain offset performs the method for determining a frequency-domain offset.

Figure 6:
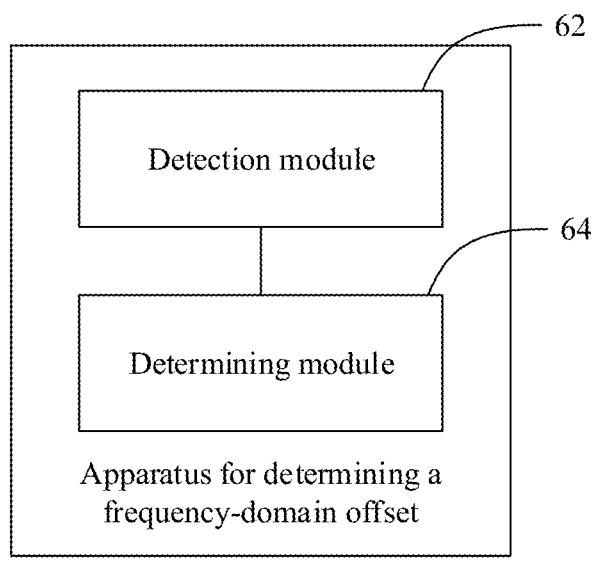
FIG. 6 is a schematic structural diagram of an apparatus for determining a frequency-domain offset according to an embodiment of this application.

Referring to FIG. 6, FIG. 6 is a schematic structural diagram of an apparatus for determining a frequency-domain offset according to an embodiment of this application. As shown in FIG. 6, the apparatus includes:

a detection module 62, configured to detect a synchronization signal block SSB; and a determining module 64, configured to determine, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

Optionally, in an optional implementation of the embodiments of this application, the second indicator field is part or all of a common SCS indicator field.

Optionally, in an optional implementation of the embodiments of this application, in a case that an association relationship is present between a common subcarrier spacing SCS and a first SCS, the second indicator field is part or all of the common SCS indicator field, where the first SCS is an SCS of the SSB determined in a case that the SSB is detected on a first frequency band.

Optionally, in an optional implementation of the embodiments of this application, the second indicator field is part or all of a physical downlink shared channel-demodulation reference signal position indicator field.

Optionally, in an optional implementation of the embodiments of this application, in a case that an association relationship is present between the physical downlink shared channel-demodulation reference signal position indicator field and a first SCS, the second indicator field is part or all of the physical downlink shared channel-demodulation reference signal position indicator field, and the first SCS is an SCS of the SSB determined in a case that the SSB is detected on a first frequency band.

Optionally, in an optional implementation of the embodiments of this application, the second indicator field is part or all of a physical downlink control channel-configuration system information block indicator field.

Optionally, in an optional implementation of the embodiments of this application, the second indicator field is part or all of a reserved indicator field.

Optionally, in an optional implementation of the embodiments of this application, the second indicator field is a combination of at least one of the following indicator fields: a common SCS indicator field, a physical downlink shared channel-demodulation reference signal position indicator field, a physical downlink control channel-configuration system information block indicator field, and a reserved indicator field.

Optionally, the frequency-domain offset in this embodiment of this application may include a frequency-domain offset jointly indicated by a first bit of the first indicator field and a second bit of the second indicator field.

The second bit of the second indicator field includes at least one of the following: a spare bit of the second indicator field and a reserved bit of the second indicator field.

Optionally, the frequency-domain offset in this embodiment of this application may further include: a frequency-domain offset indicated by a first bit of the first indicator field, or a frequency-domain offset indicated by a second bit of the second indicator field.

The apparatus for determining a frequency-domain offset provided in this embodiment of this application can implement the processes implemented by the method for determining a frequency-domain offset in the method embodiment in FIG. 5. To avoid repetition, details are not described herein again.

According to the apparatus for determining a frequency-domain offset in this embodiment of this application, an existing unused indicator field may be used along with ssb-SubcarrierOffset to indicate $K_{ssb}$, not requiring additional bits. This can reduce resources and use more bits for configuration of $K_{ssb}$, implementing more flexible configuration of $K_{ssb}$.

Optionally, an embodiment of this application further provides a communication device, including a processor, a memory, and a program or an instruction stored on the memory and capable of running on the processor, where when the program or instruction is executed by the processor, the processes of the foregoing embodiments of the method for determining a frequency-domain offset are implemented, with the same technical effects achieved. To avoid repetition, details are not described herein again.

It should be noted that the communication device in this embodiment of this application includes the foregoing mobile communication devices and non-mobile communication devices.

Figure 7:
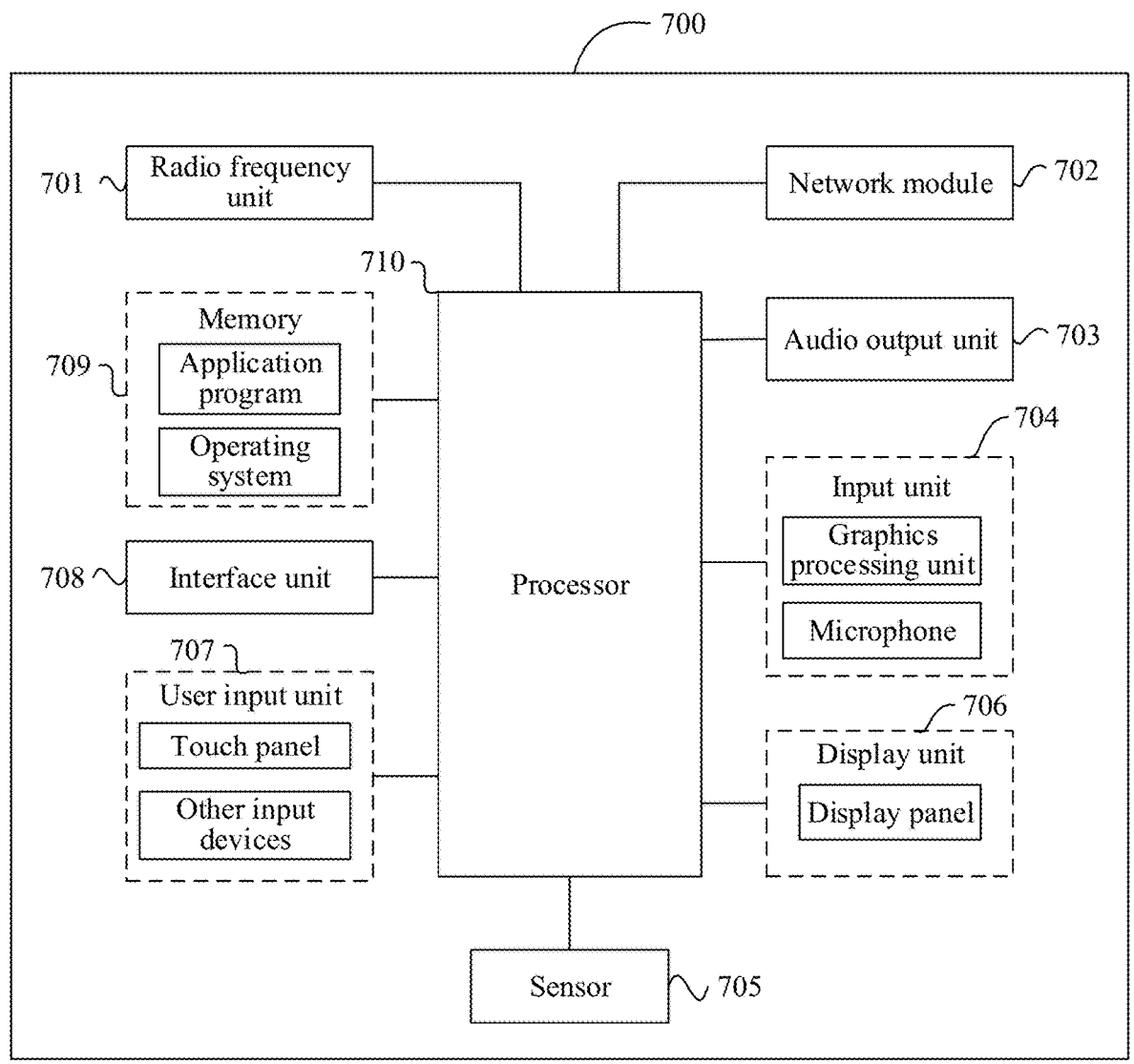
FIG. 7 is a structural diagram of another communication device according to an embodiment of this application.

FIG. 7 is a schematic diagram of a hardware structure of a communication device according to an embodiment of this application.

The communication device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the communication device 700 may further include a power supply (such as a battery) for supplying power to the components. The power supply may be logically connected to the processor 710 through a power management system. In this way, functions such as charge management, discharge management, and power consumption management are implemented by using the power management system. The structure of the communication device shown in FIG. 7 does not constitute a limitation on the communication device. The communication device may include more or fewer components than those shown in FIG. 7, or a combination of some components, or components disposed differently. Details are not described herein again.

The radio frequency unit 701 is configured to detect a synchronization signal block SSB.

The processor 710 is configured to determine, based on a first indicator field and/or a second indicator field in the SSB, a frequency-domain offset of the SSB with respect to a common resource block raster, where the first indicator field is an SSB frequency-domain offset indicator field, and the second indicator field is part or all of at least one indicator field different from the first indicator field.

More bits may be used to configure $K_{ssb}$ by using the communication device in this application.

Optionally, the second indicator field is part or all of a common SCS indicator field.

Optionally, in a case that an association relationship is present between a common subcarrier spacing SCS and a first SCS, the second indicator field is part or all of the common SCS indicator field, where the first SCS is an SCS of the SSB determined in a case that the SSB is detected on a first frequency band.

Optionally, the second indicator field is part or all of a physical downlink shared channel-demodulation reference signal position indicator field.

Optionally, in a case that an association relationship is present between the physical downlink shared channel-demodulation reference signal position indicator field and a first SCS, the second indicator field is part or all of the physical downlink shared channel-demodulation reference signal position indicator field, and the first SCS is an SCS of the SSB determined in a case that the SSB is detected on a first frequency band.

Optionally, the second indicator field is part or all of a physical downlink control channel-configuration system information block indicator field.

Optionally, the second indicator field is part or all of a reserved indicator field.

Optionally, the second indicator field is a combination of at least one of the following indicator fields: a common SCS indicator field, a physical downlink shared channel-demodulation reference signal position indicator field, a physical downlink control channel-configuration system information block indicator field, and a reserved indicator field.

Optionally, the frequency-domain offset includes a frequency-domain offset jointly indicated by a first bit of the first indicator field and a second bit of the second indicator field.

Optionally, the second bit of the second indicator field includes at least one of the following: a spare bit of the second indicator field and a reserved bit of the second indicator field.

Optionally, the frequency-domain offset includes: a frequency-domain offset indicated by a first bit of the first indicator field, or a frequency-domain offset indicated by a second bit of the second indicator field.

It should be understood that in this embodiment of this application, the radio frequency unit 701 may be configured to receive and send information, or to receive and send a signal in a call process, and specially, after receiving downlink data from a base station, send the downlink data to the processor 710 for processing; and also send uplink data to the base station. Generally, the radio frequency unit 701 includes but is not limited to an antenna, at least one amplifier, a transceiver, a coupler, a low noise amplifier, and a duplexer. In addition, the radio frequency unit 701 may further communicate with another device by using a wireless communication system and network.

The terminal provides a user with wireless broadband internet access by using the network module 702, for example, helping the user to send and receive e-mails, browse web pages, and access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal reception tone or a message reception tone) that is related to a specific function performed by the terminal 700. The audio output unit 703 includes a speaker, a buzzer, a telephone receiver, and the like.

The input unit 704 is configured to receive audio or video signals.

The terminal 700 further includes at least one sensor 705, such as an optical sensor, a motion sensor, and another sensor.

The display unit 706 is configured to display information input by the user or information provided for the user.

The user input unit 707 may be configured to receive input digit or character information and generate key signal input related to user settings and function control of the terminal.

The interface unit 708 is an interface connecting an external apparatus to the terminal 700. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, an earphone port, or the like. The interface unit 708 may be configured to receive an input (for example, data information and power) from the external apparatus and transmit the received input to one or more elements within the terminal 700, or may be configured to transmit data between the terminal 700 and the external apparatus.

The memory 709 may be configured to store software programs and various data. The memory 709 may mainly include a program storage area and a data storage area. The program storage area may store an operating system, an application program required by at least one function (for example, a sound playing function and an image playing function), and the like. The data storage area may store data (for example, audio data and a phone book) created according to use of the mobile phone. In addition, the memory 709 may include a high-speed random access memory, and may further include a non-volatile memory, for example, at least one magnetic disk storage device, a flash storage device, or another volatile solid-state storage device.

The processor 710 is a control center of the terminal, and connects all parts of the entire terminal by using various interfaces and lines. By running or executing a software program and/or a module stored in the memory 709 and invoking data stored in the memory 709, the processor 710 performs various functions of the terminal and data processing, so as to perform overall monitoring on the terminal. The processor 710 may include one or more processing units. Preferably, the processor 710 may integrate an application processor and a modem processor. The application processor mainly processes an operating system, a user interface, an application program, and the like. The modem processor mainly processes wireless communication. It can be understood that alternatively, the modem processor may not be integrated into the processor 710.

An embodiment of this application further provides a readable storage medium, where the readable storage medium stores a program or an instruction, and when the program or instruction is executed by a processor, the processes of the foregoing embodiments of the method for determining a frequency-domain offset are implemented, with the same technical effects achieved. To avoid repetition, details are not described herein again.

The processor is the processor in the communication device in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or an instruction to implement the processes of the foregoing embodiments of the method for determining a frequency-domain offset, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A method for determining a frequency-domain offset, comprising:
    detecting a synchronization signal block (SSB); and
    characterized by determining, based on a first indicator field and a second indicator field in the SSB, or only based on the second indicator field in the SSB, a frequency-domain offset of the SSB with respect to a common resource block raster, wherein
    the first indicator field is an SSB frequency-domain offset indicator field, and the second indicator field is part or all of at least one indicator field different from the first indicator field,
    wherein in a case that an association relationship is present between the physical downlink shared channel-demodulation reference signal position indicator field and a first SCS, the second indicator field comprises part or all of the physical downlink shared channel-demodulation reference signal position indicator field, and the first SCS is an SCS of the SSB determined in a case that the SSB is detected.

2. The method according to claim 1, wherein the second indicator field further comprises is-part or all of a common SCS indicator field.

3. The method according to claim 2, wherein in a case that an association relationship is present between a common subcarrier spacing (SCS) and a first SCS, the second indicator field further comprises part or all of the common SCS indicator field, and the first SCS is an SCS of the SSB determined in a case that the SSB is detected.

4. The method according to claim 1, wherein the second indicator field further comprises part or all of a physical downlink control channel-configuration system information block indicator field.

5. The method according to claim 1, wherein the second indicator field further comprises part or all of a reserved indicator field.

6. The method according to claim 1, wherein the second indicator field further comprises a combination of at least one of the following indicator fields: a common SCS indicator field, a physical downlink control channel-configuration system information block indicator field, and a reserved indicator field.

7. The method according to claim 1, wherein the frequency-domain offset comprises:
    a frequency-domain offset jointly indicated by a first bit of the first indicator field and a second bit of the second indicator field.

8. The method according to claim 7, wherein the second bit of the second indicator field comprises at least one of the following:
    a spare bit of the second indicator field and a reserved bit of the second indicator field.

9. The method according to claim 1, wherein the frequency-domain offset comprises: a frequency-domain offset indicated by a first bit of the first indicator field, or a frequency-domain offset indicated by a second bit of the second indicator field.

10. A communication device, comprising a processor, a memory, and a program or an instruction stored on the memory and capable of running on the processor, wherein the processor executes the program or instruction to perform:
    detecting a synchronization signal block (SSB); and
    determining, based on a first indicator field and a second indicator field in the SSB, or only based on the second indicator field in the SSB, a frequency-domain offset of the SSB with respect to a common resource block raster, wherein
    the first indicator field is an SSB frequency-domain offset indicator field, and the second indicator field is part or all of at least one indicator field different from the first indicator field,
    wherein in a case that an association relationship is present between the physical downlink shared channel-demodulation reference signal position indicator field and a first SCS, the second indicator field comprises part or all of the physical downlink shared channel-demodulation reference signal position indicator field, and the first SCS is an SCS of the SSB determined in a case that the SSB is detected.

11. The communication device according to claim 10, wherein the second indicator field further comprises part or all of a common SCS indicator field.

12. The communication device according to claim 11, wherein in a case that an association relationship is present between a common subcarrier spacing (SCS) and a first SCS, the second indicator field further comprises part or all of the common SCS indicator field, and the first SCS is an SCS of the SSB determined in a case that the SSB is detected.

13. The communication device according to claim 10, wherein the second indicator field further comprises part or all of a physical downlink control channel-configuration system information block indicator field.

14. The communication device according to claim 10, wherein the second indicator field further comprises part or all of a reserved indicator field.

15. The communication device according to claim 10, wherein the second indicator field further comprises a combination of at least one of the following indicator fields: a common SCS indicator field, a physical downlink control channel-configuration system information block indicator field, and a reserved indicator field.

16. The communication device according to claim 10, wherein the second indicator field further comprises a combination of at least one of the following indicator fields: a common SCS indicator field, a physical downlink control channel-configuration system information block indicator field, and a reserved indicator field.

17. The communication device according to claim 10, wherein the frequency-domain offset comprises:
a frequency-domain offset jointly indicated by a first bit of the first indicator field and a second bit of the second indicator field.

18. The communication device according to claim 10, wherein the frequency-domain offset comprises: a frequency-domain offset indicated by a first bit of the first indicator field, or a frequency-domain offset indicated by a second bit of the second indicator field.

19. A non-transitory readable storage medium, wherein the readable storage medium stores a program or an instruction, and a processor executes the program or instruction to perform:
detecting a synchronization signal block (SSB); and
determining, based on a first indicator field and a second indicator field in the SSB, or only based on the second indicator field in the SSB, a frequency-domain offset of the SSB with respect to a common resource block raster, wherein
the first indicator field is an SSB frequency-domain offset indicator field, and the second indicator field is part or all of at least one indicator field different from the first indicator field,
wherein in a case that an association relationship is present between the physical downlink shared channel-demodulation reference signal position indicator field and a first SCS, the second indicator field comprises part or all of the physical downlink shared channel-demodulation reference signal position indicator field, and the first SCS is an SCS of the SSB determined in a case that the SSB is detected.

20. The communication device according to claim 17, wherein the second bit of the second indicator field comprises at least one of the following:
a spare bit of the second indicator field and a reserved bit of the second indicator field.

* * * * *